(12) United States Patent
Tye et al.

(10) Patent No.: US 7,537,290 B2
(45) Date of Patent: May 26, 2009

(54) LIGHT WEIGHT, STIFFENED, TWIST RESISTANT, EXTRUDED VEHICLE AXLE

(75) Inventors: Stephen J. Tye, Rochester, MI (US); James L. Oyer, Westland, MI (US)

(73) Assignee: U.S. Manufacturing Company, Warren, MI (US)

( * ) Notice: Subject to any disclaimer, the term of this patent is extended or adjusted under 35 U.S.C. 154(b) by 207 days.

(21) Appl. No.: 11/305,468

(22) Filed: Dec. 16, 2005

(65) Prior Publication Data

US 2007/0137277 A1 Jun. 21, 2007

(51) Int. Cl.
*B60B 35/00* (2006.01)
(52) U.S. Cl. .................. 301/124.1; 301/129
(58) Field of Classification Search .......... 301/124.1, 301/125, 129
See application file for complete search history.

(56) References Cited

U.S. PATENT DOCUMENTS

| | | | | |
|---|---|---|---|---|
| 2,013,786 A | * | 9/1935 | Mogford et al. | 301/124.1 |
| 2,069,911 A | * | 2/1937 | Bourdon | 267/188 |
| 2,712,477 A | * | 7/1955 | Clough | 384/116 |
| 3,837,205 A | | 9/1974 | Simon | |
| 3,886,649 A | | 6/1975 | Simon | |
| 4,292,831 A | | 10/1981 | Simon | |
| 5,320,580 A | * | 6/1994 | Simon | 464/183 |
| 6,439,672 B1 | * | 8/2002 | Simon | 301/124.1 |
| 7,090,309 B2 | * | 8/2006 | Blessing et al. | 301/124.1 |

* cited by examiner

*Primary Examiner*—Jason R Bellinger
(74) *Attorney, Agent, or Firm*—Harness, Dickey & Pierce, P.L.C.

(57) ABSTRACT

An extruded, tubular vehicle axle for front and rear wheel applications, is formed with integral, radially outwardly extending ribs, at the radial top and bottom dead centers of the axle, and continuously extending longitudinally along substantially the entire length of the axle parallel to the axis of the axle. The opposite end portions of the axle are snugly inserted within corresponding sockets formed, for example, in a vehicle axle yoke or carrier or housing, which sockets are provided with internal grooves for snugly receiving the ribs at the respective end portions. The exterior wall surface of the axle is substantially uniform in cross-section. The interior wall surface of the axle tube may vary, at pre-selected locations, to increase or decrease the wall thicknesses at such locations. The axle resists rotation relative to the sockets, under extreme torsional loads, and resists longitudinal bending or flexing, while being of relatively light weight.

10 Claims, 5 Drawing Sheets

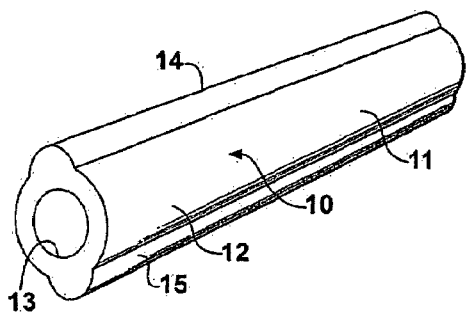
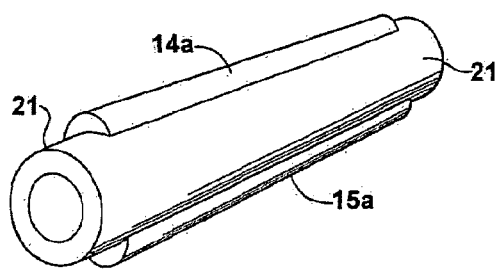
FIG - 1    FIG - 2
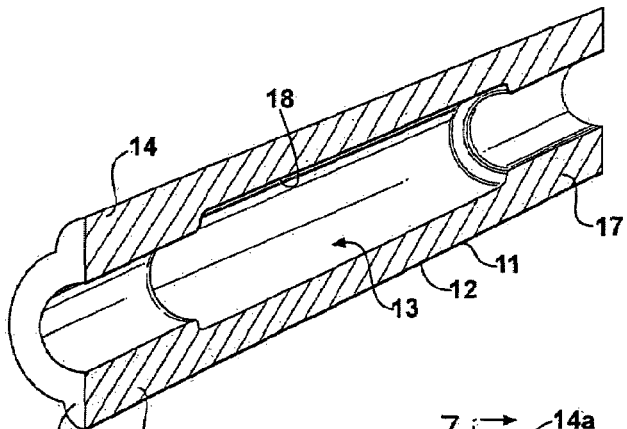
FIG - 3
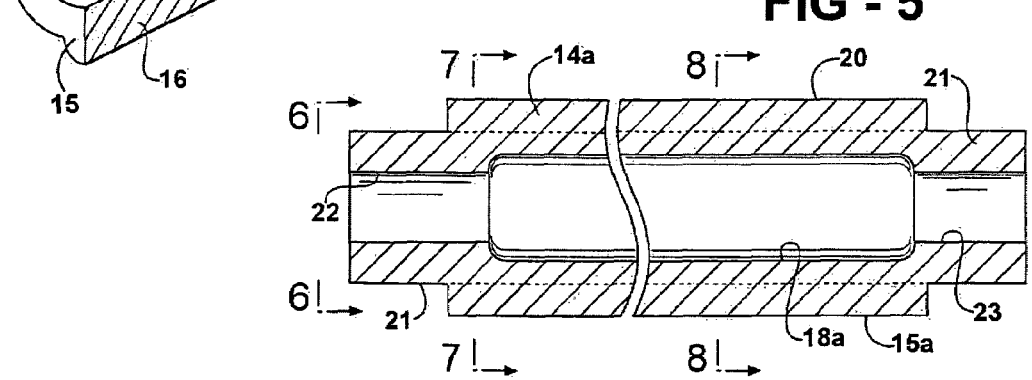
FIG - 5
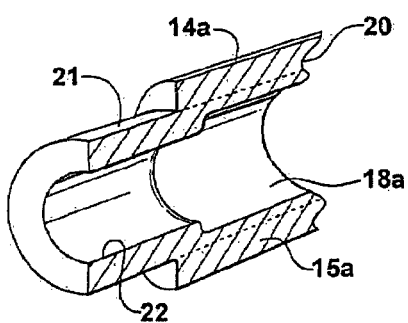
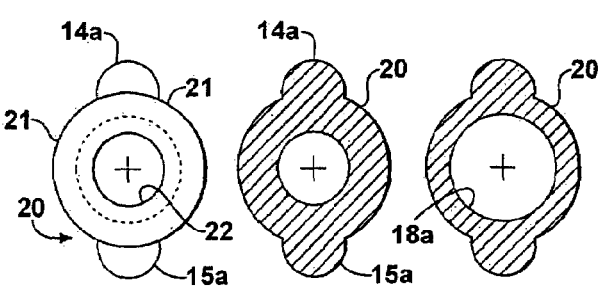
FIG - 4    FIG - 6    FIG - 7    FIG - 8

LIGHT WEIGHT, STIFFENED, TWIST RESISTANT, EXTRUDED VEHICLE AXLE

BACKGROUND OF THE INVENTION

This invention relates to an automotive vehicle axle for front and rear drive applications. Such axles are typically formed of extruded metal tubing. The opposite ends of the tubular axle are inserted within sockets formed, for example, on a conventional wheel support yoke or in a conventional carrier or housing through which engine power is transmitted to the axle.

Various attempts to reduce the weight of components of an automotive vehicle have included forming tubular axles with portions that are thinner in wall cross-section where lesser loads are imposed upon the axle and, conversely, with thickened cross-section wall portions where the anticipated loads are greater. In such types of axles, the beam strength of the axles may be insufficient to resist bending or flexing of the axle under extreme loads. Moreover, the axle may rotate or twist relative to the sockets that hold the ends of the axle when extreme torsional loads are applied. Hence, it would be desirable to maintain the light weight of a tubular axle while at the same time substantially increasing its bending or flexing resistance and, also, its resistance to twisting or rotating relative to its supporting sockets.

The methods for cold forming or extruding metal tubular axles and simultaneously forming thinner and thicker wall thicknesses at pre-selected locations within the tubular axle, are known. For example, U.S. Pat. No. 3,837,205 issued Sep. 24, 1974, for a "Process For Cold Forming A Metal Tube With An Inwardly Thickened End," issued to Joseph A. Simon, discloses the method for forming, by an extrusion-type process, tubular axles having a greater wall thickness at an end while maintaining a thinner wall thickness along its length. Similarly, U.S. Pat. No. 3,886,649 issued Jun. 3, 1975, for a "Process For Cold Forming A Metal Tube With An Inwardly Thickened End," issued to Joseph A. Simon, discloses a cold forming process for providing a uniform wall thickness tubular axle having an increased wall thickness at an end. Another U.S. Pat. No. 4,292,831 issued Oct. 6, 1981, for a "Process For Extruding A Metal Tube With Inwardly Thickened End Portions," issued to Joseph A. Simon, discloses a method for cold forming, in an extrusion-like process, thickened end portions on an otherwise thin wall axle. Lastly, U.S. Pat. No. 5,320,580 issued Jun. 14, 1994, for a "Lightweight Drive Shaft," issued to Joseph A. Simon, discloses a drive shaft for automotive vehicles having varying wall thicknesses with splined ends for connecting the shaft to supporting structures.

As is known, automotive vehicle axles are periodically subjected to extreme loads, as for example, due to random, sudden contacts between the vehicle wheels and extremely rough road surface areas, which could damage the axles. Such loads may cause the axles to twist or rotate relative to their connecting sockets or may cause some bending or flexing of the axle. In order to avoid or limit such axle damages, the axle walls had to be made with a thicker cross-section than necessary for normal loads. Such heavier or thicker walls result in heavier weight axles. Consequently, the invention herein is primarily concerned with providing a lighter-weight axle, which is accomplished by using thin, cross-sectional wall thicknesses where feasible for handling normal loads, while simultaneously rigidifying or stiffening the axle wall along its top dead center and bottom dead center to preclude bending or flexing under sudden extreme loads. This also interlocks the axle ends within their connecting sockets and resists twisting of an axle or rotation of an axle relative to its sockets.

SUMMARY OF THE INVENTION

The invention herein contemplates cold forming, similar to extruding, a tubular axle starting with a metal ring inserted within a die and pushing the ring through the throat of the die over a mandrel to elongate the ring into a tube and to form different wall thicknesses along the length of the expanded tube. During the extrusion process, at least one, and preferably two, diametrically opposite radially outwardly extending ribs are integrally formed along substantially the full length of the tube. Thus, the entire tube wall and the ribs are of substantially homogenous grain structure.

The ribs are formed along the top and bottom diametrical centers of the tubular axle. These are referred to as the top and bottom dead centers when the axle tube is horizontally arranged. The ribs which extend substantially the full length of the tube increase the beam strength to resist bending and flexing. Simultaneously, the opposite end portions of the rigidifying ribs tightly fit within, and interlock with, corresponding grooves formed in the axle-receiving sockets which receive the ends of the axle.

The axle-receiving sockets could be formed in the conventional yokes which are connected, through other elements, to the wheels of a vehicle or they could be formed in a conventional carrier or housing, as for example, the housing for a vehicle differential mechanism. The formation of the ribs along the opposite, diametrically upper and lower surfaces of the axle, permits the use of relatively thinner wall cross-sections at pre-determined locations along the length of the axle. This permits a reduction in the weight of the axle, while maintaining the strength to resist extreme torsional or transverse loadings which might cause twisting or bending or flexing of the axle.

An object of this invention is to provide a lightweight axle which, although formed with thin wall sections to reduce weight, is able to resist extreme torsional or transversely directed loadings which might otherwise cause bending, flexing or twisting or rotation of the axle, and which axle can be produced relatively inexpensively.

Another object of this invention is to permit the production of extruded or cold formed tubular, high strength axles by using available equipment with a low cost die modification to produce an unusually stronger and stiffer lightweight axle.

Still a further object of this invention is to maintain a substantially homogenous grain structure of the tubular axle and ribs integrally formed along the upper and lower, diametrically opposite surface areas for providing a lighter weight, but nevertheless strong axle, at a minimal increased cost of production.

Yet another object is to provide integrally formed, longitudinally extending ribs along the top and bottom dead centers of an axle tube which help to rapidly locate and secure attachments to the axle.

These and other objects and advantages of this invention will become apparent upon reviewing the following description, of which the attached drawings form a part.

BRIEF DESCRIPTION OF THE DRAWINGS

The present invention will become more apparent from the following detailed description and the accompanying drawings which form a part of the description, wherein:

FIG. 1 is a perspective view of the axle.

FIG. 2 is a perspective view, similar to FIG. 1, of a modification illustrating the removal of portions of the ribs at the end portions of the axle.

FIG. 3 is an enlarged, perspective, cross-sectional view of the axle illustrated in FIG. 1.

FIG. 4 is an enlarged, fragmentary, cross-sectional view of the end portion of the axle illustrated in the modification of FIG. 2.

FIG. 5 is a cross-sectional view of the axle illustrated in FIG. 2.

FIG. 6 is an end view taken in the direction of arrows 6-6 of FIG. 5.

FIG. 7 is a cross-sectional view taken in the direction of arrows 7-7 of FIG. 5.

FIG. 8 is a cross-sectional view taken in the direction of arrows 8-8 of FIG. 5.

DETAILED DESCRIPTION OF THE PREFERRED EMBODIMENTS

Figure 9:
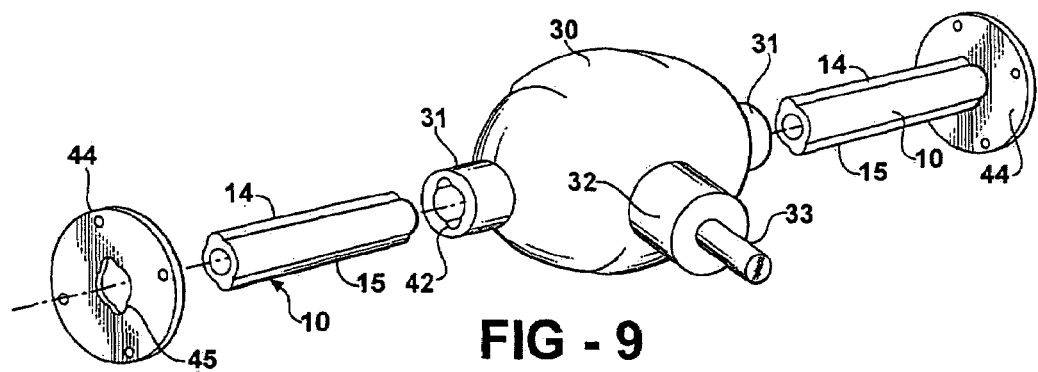
FIG. 9 is a perspective view, schematically illustrating the arrangement of the axles with respect to a schematically illustrated carrier or housing of a vehicle and to conventional wheel connection end plates.

The following description of the preferred embodiments is exemplary in nature and is not intended to limit the invention, its application, or uses.

FIGS. 1 and 3 illustrate a tubular axle 10 for use with front or rear wheel assemblies used on vehicles. The axle is in the form of an elongated, hollow, shaft or tube 11 which has an exterior wall surface 12 and an interior wall surface 13. An integral radially outwardly extending bead or rib 14 is formed on the exterior wall surface. The bead is formed along the upper "dead center" of the axle when the axle is in a horizontal position. Diametrically opposite to the bead 14 is a lower bead or rib 15 integral with the lower or bottom "dead center" of the axle. Preferably, the beads are continuous and extend along substantially the full length of the axle tube.

The tube may be formed with a thickened wall end portion 16 at one end and, similarly, a thickened end wall portion 17 at its opposite end. These thickened wall sections are formed in the extrusion process used for making the axle. The thinner wall portion 18 that is located between the thickened end sections may be of a substantially uniform thickness. However, additional thickened portions may be selectively formed along the length of the interior of the tube where it is anticipated that heavy loads might be applied during operation of the vehicle upon which the axle is mounted.

As illustrated in FIGS. 2, 4 and 5, a modified axle tube 20 is provided with cylindrical end portions or stubs 21 by removing the end portions of the ribs 14a and 15a. The opposite end portions of the tubular axle are thickened at 22 and 23 relative to the thinner central portion 18a located between the thickened portions.

Figure 10:
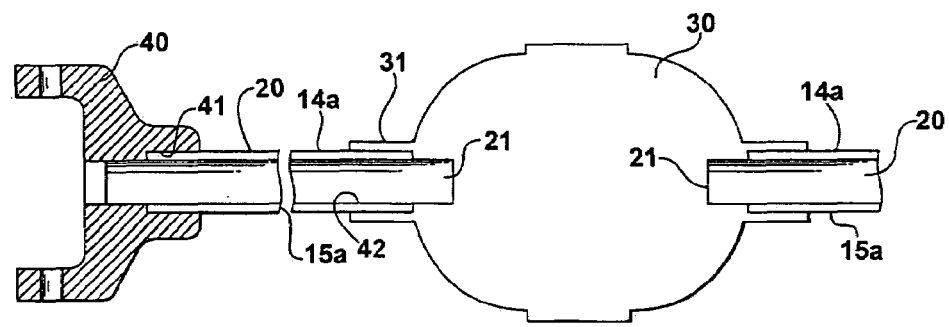
FIG. 10 schematically illustrates one end of a pair of axles connected within sockets formed in a conventional carrier (shown schematically) and opposite ends of the axles arranged relative to sockets formed in wheel connection yokes.
Figure 11:
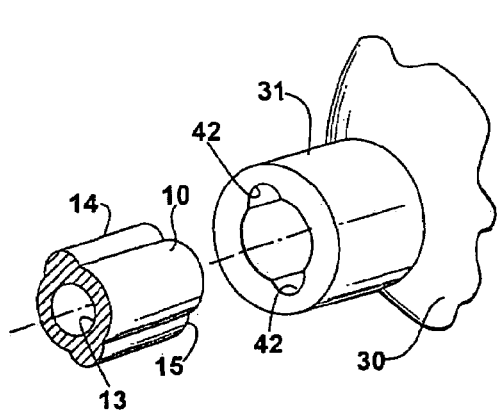
FIG. 11 is an enlarged, perspective, fragmentary view showing the end of an axle, corresponding to the axle shown in FIG. 1, about to be inserted in a socket formed, for example, in a carrier or housing.
Figure 12:
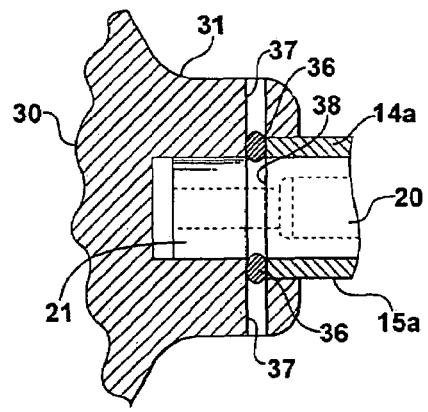
FIG. 12 is an enlarged, fragmentary, cross-sectional view showing the end of an axle inserted within a carrier socket and secured therein with weld material or adhesive material.

As shown schematically in FIG. 9, the axle is intended to be fitted into and supported by a conventional carrier or housing 30, which is shown schematically and which is provided with one or more axle-receiving sockets 31. In this example, the carrier is also provided with a center socket 32 which receives the end of a drive shaft 33. FIG. 12 illustrates an example for securing the end portion of the axle 21 within the housing socket by means of weld material or a suitable adhesive material 36, which is or may be positioned through holes 37 formed in the wall which provides the socket and within corresponding grooves or slots 38 which may be formed in the end portions or stubs 21 of the axle. In FIG. 10, the axle that is formed with cylindrical end 21 portions has one end connected to a conventional front axle wheel yoke 40 which has a yoke socket 41 that receives the outer end of the axle. However, either or both of the sockets formed in the carrier 30 and in the yoke 40 may be provided with axially arranged grooves 42 and 43 respectively, to receive the ribs 14a and 15a.

FIG. 9 illustrates a modification of the socket arrangement for receiving an end of the axle. In that figure, an end plate 44 is illustrated as having grooves 45 for receiving the outer ends of the axle tube 10. Such plates are conventional, although the shape or forms may change somewhat for connecting wheels to a vehicle in various types of vehicles.

As can be seen, the particular sockets to which the axles are connected may be formed in various structural elements of a vehicle which engage wheel axles which are connected to either driven wheels or to freely rotating wheels, depending upon the vehicle construction. Thus, the axles may be modified accordingly to fit into and to tightly engage within their respective sockets. Also, in some instances, a single rib may be sufficient for resisting bending, flexing or twisting or rotation of the axle relative to the socket within which it is fitted as shown in FIGS. 17-20. Preferably, a pair of ribs is utilized, along the upper and bottom dead centers of the axle, respectively, for providing the desired resistance to bending or flexing while enabling a significant reduction in weight of the axle by using thinner wall sections in the axles.

FIGS. 13A-13F schematically illustrate a method for forming the tubular axles. The method begins with an extrusion die 50 which has a central bore 51 and an extrusion die throat 52. Grooves 53 are formed on diametrically opposite sides of the die throat.

Figure 13A:
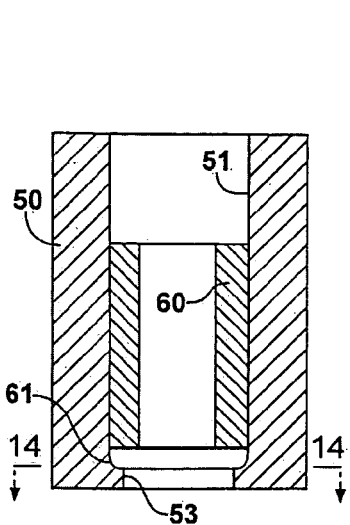
FIG. 13A illustrates schematically, in cross-section, a die containing a ring-shaped blank for extruding or cold forming the axle.
Figure 13B:
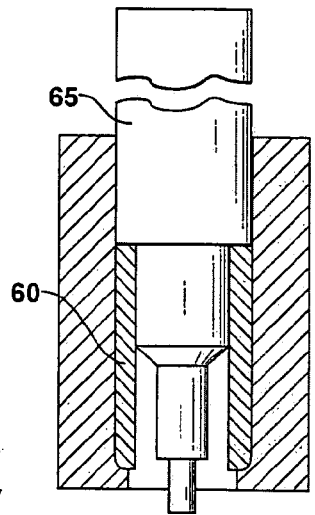
FIG. 13B schematically illustrates the insertion of a pusher member or punch within the die and contacting the trailing end of the blank for pushing the blank through the throat of the die.
Figure 13C:
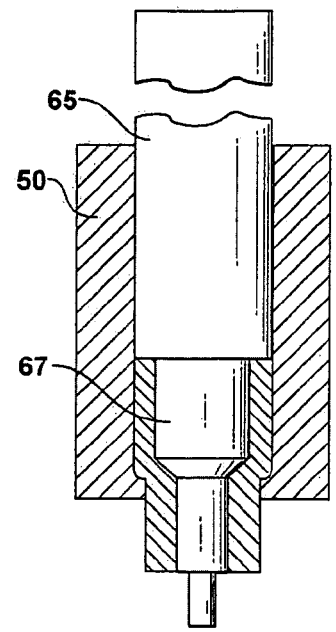
FIG. 13C schematically illustrates, in cross-section, the pusher member moving the blank through the die throat.
Figure 13D:
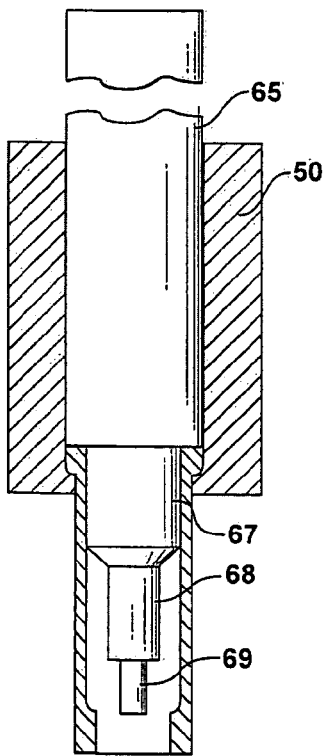
FIG. 13D illustrates the pusher member in a position near the completion of the extrusion of the blank through the die throat.
Figure 13E:
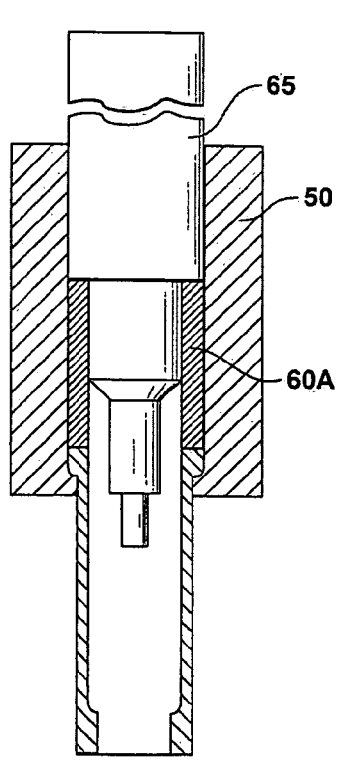
FIG. 13E illustrates the placement of a newly inserted blank in the die, abutting the almost-extruded original blank, with the pusher member engaging and pushing against the newly inserted blank which, in turn, pushes against the original blank.
Figure 16:
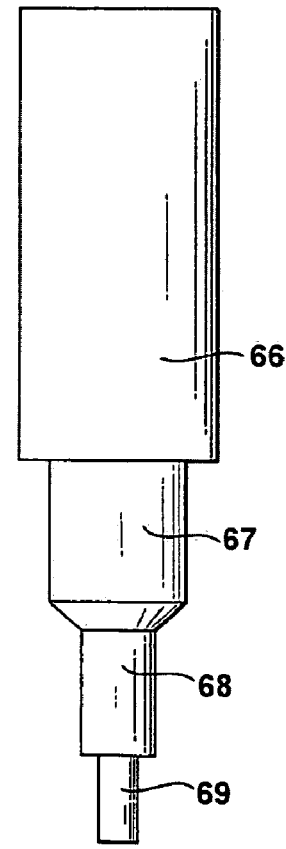
FIG. 16 is an enlarged, schematic, view of a pusher member or punch for forming the axle configuration illustrated in FIG. 15.
Figure 17:
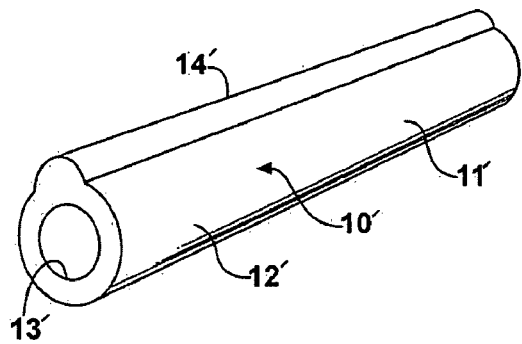
FIG. 17 is a perspective view of an axle having only one longitudinal rib along the top dead center of the axle.
Figure 18:
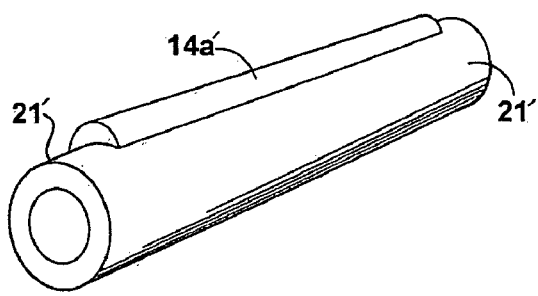
FIG. 18 is a perspective view, similar to FIG. 17, of a modification illustrating the removal of portions of the rib at the end portions of the axle.
Figure 19:
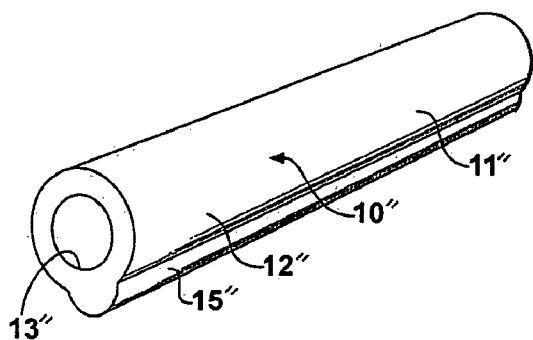
FIG. 19 is a perspective view of an axle having only one longitudinal rib along the bottom dead center of the axle.

A ring-shaped metal blank 60 is inserted within the bore 51 of the die. The die throat has shoulders 61 against which the lead end of the blank rests. A punch or longitudinally moving pusher member 65 is inserted in the die bore and engages the trailing end of the ring. In this example, the pusher member is provided with extension sections of different diameters which may serve as mandrels. As indicated in FIG. 16, the upper portion of the pusher member 66 is of a diameter which closely fits within the bore 50 of the die. Then, the first depending or upper section 67 of the pusher member fits into the opening in the ring blank as shown in FIG. 13D. The next section 68 forms the interior wall of the thin wall portion of the tube. The last section 69 acts as a mandrel to form the thicker wall section of the tube.

The mandrel sections may be varied to also form one or more inner thickened wall portions which may be needed for some tubular axles where extreme loads may be anticipated at locations along the central portions of the axle.

Figure 13F:
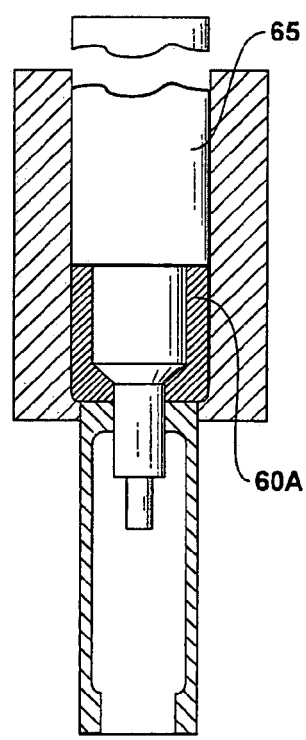
FIG. 13F illustrates the pusher member or punch forcing the newly inserted blank through the die throat and accordingly, pushing the substantially finished axle out, through the die throat.
Figure 15:
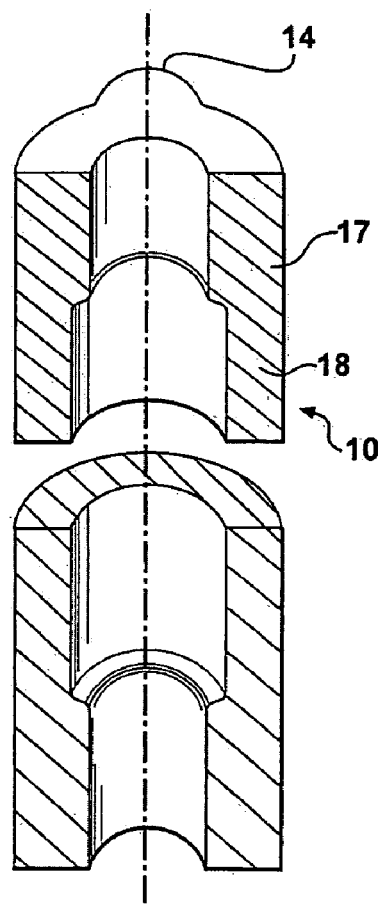
FIG. 15 illustrates, in cross-section, the completed axle having thickened portions.
Figure 14:
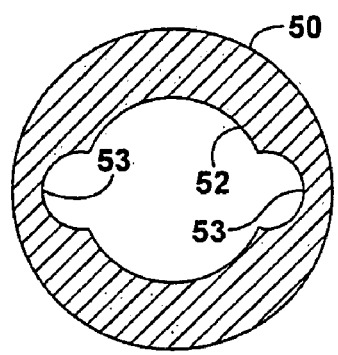
FIG. 14 is a cross-sectional, end view of the die throat, taken in the direction of arrows 14-14 of FIG. 13F, illustrating channels or grooves formed in the die throat for forming integral ribs on the extruded axle.

After the blank 60 is substantially extruded as illustrated in FIG. 13D, the pusher member 65 is retracted out of the die 50. A new blank 60*a* is inserted in the die to abut the trailing end of the original blank 60 (see FIG. 13E). The pusher is re-inserted in the die to push the new blank 60*a* against the trailing end of the original blank 60 which completes the extrusion of the original blank through the die throat 52 and simultaneously begins forming the new blank into an axle as shown in FIG. 13F.

The extrusion of the axle tube will, during the extrusion process, provide the longitudinally extending ribs on the diametrically opposite upper and lower dead centers of the axle. In those instances where it is desired to form cylindrical ends on the axles, that is, portions or stubs that are free of the ribs, the ribs can be machined off in a subsequent step. Also, although referred to as cylindrical, the axle may be of a cross-sectional shape which is elliptical in outer or in inner surfaces or may have inner wall surfaces which are non-circular or off-centers. In all cases, the ribs when formed integrally with the extruded tube have the same metallic grain structure as the tube which substantially increases the strength of the overall product.

Figure 20:
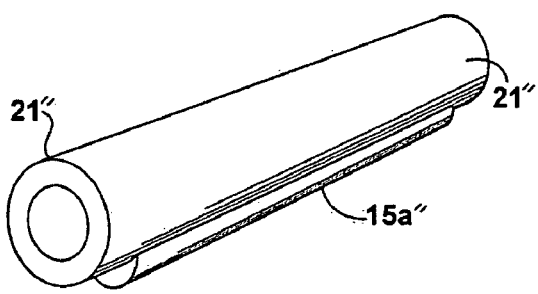
FIG. 20 is a perspective view, similar to FIG. 19, of a modification illustrating the removal of portions of the rib at the end portions of the axle.

FIGS. 17-20 illustrate a tubular axle, similar to those shown in FIGS. 1 and 2, but with only one longitudinal rib along the top dead center of the axle (FIG. 17), with portions of this rib removed at the end portions of the axle (FIG. 18), with only one longitudinal rib along the bottom dead center of the axle (FIG. 19) and with portions of this rib removed at the end portions of the axle (FIG. 20). For ease of illustration, similar features to those shown in FIGS. 1 and 2 (10, 11, 12, 13, 14, 14*a*, 15, 15*a* and 21) have been numbered as 10', 11', 12', 13', 14', 14*a*' and 21' in FIGS. 17 and 18, and as 10", 11", 12", 13", 15", 15*a*" and 21" in FIGS. 19 and 20.

This invention may be further developed within the scope of the attached claims. Thus, having fully described at least one operative embodiment of this invention, we now claim:

What is claimed is:

1. A lightweight axle for a vehicle comprising:
   a horizontal, elongated, hollow tube having a wall, an exterior wall surface and an interior wall surface, with the wall being of substantially uniform thickness;
   a pair of elongated, radially outwardly extending ribs formed as additional wall material on the diametrically opposite, uppermost and lowermost dead centers of the exterior wall surface and extending longitudinally along substantially the full length of the exterior wall surface to form thickened wall sections;
   said ribs being substantially parallel to the axis of the tube and the pair of ribs and the tube being integrally formed of a one-piece extrusion;
   the end portions of the axle being adapted to fit within sockets formed in connection members, said sockets provided with parallel grooves arranged for receiving adjacent end portions of the respective ribs for preventing the axle from rotating within the socket due to torsional loads and whereby the ribs provide sufficient additional wall thickness to reinforce the axle against bending and flexing under applied loads during vehicle use.

2. A lightweight axle as defined in claim 1, and wherein pre-selected portions of the wall defining the tubular axle are thickened and other portions between the thickened portions are thinner in cross-section, with at least one thickened portion being formed by reducing the tube interior opening along the pre-selected locations;
   with the thicker tube portions being located along areas where higher loads are anticipated and the thinner portions being located in portions where lower applied loads are anticipated.

3. A lightweight axle as defined in claim 1, and wherein the tube and the ribs are formed of a homogenous metallic grain structure.

4. A lightweight axle as defined in claim 2, and at least one of the tube end portions being free of the ribs to provide a mounting end portion on the axle for inserting within the corresponding socket.

5. A lightweight, tubular axle for a vehicle comprising:
   a horizontally arranged, elongated, hollow tube having a wall, an exterior wall surface and an interior wall surface with the wall being of substantially uniform thickness;
   a radially outwardly extending rib formed as additional wall material integral with the exterior wall surface and extending longitudinally, along substantially the full length of the exterior wall surface along one of the top or bottom dead centers of the tube to form a thickened wall section;
   said rib being substantially parallel to the central axis of the tube and the tube and the rib being integrally formed as a one-piece metal extrusion;
   said rib being of substantially uniform cross-section along its length and providing sufficient additional wall thickness for reinforcing the tubular axle against bending, flexing or twisting due to applied loads during use of the axle on a vehicle.

6. A lightweight axle as defined in claim 5, and including a second, substantially identical rib formed on the bottom dead center of the axle tube, diametrically opposite to the first mentioned rib which is formed on the top dead center of the axle tube, whereby the two ribs form a pair of reinforcing elements along the upper and lower dead centers of the tube to reinforce the tube against bending, flexing or twisting under loads and for enabling the walls of the tube to be thinner than would otherwise be possible in the absence of the ribs.

7. A lightweight axle for a vehicle as defined in claim 6, and wherein the wall defining the tube is thickened along axially directed portions which are separated by portions having thinner wall thicknesses between said thickened along axially directed portions, with the respective thickened portions and portions having thinner wall thicknesses being pre-determined depending upon the anticipated maximum loads on the axle when in use on a vehicle.

8. An axle system for a vehicle comprising:
- a horizontally elongated, hollow axle tube having a wall of substantially uniform thickness, an exterior wall surface and an interior wall surface, for connection, at one of its ends, to a wheel support and at its opposite end to a connector member;
- a pair of elongated, radially outwardly extending ribs formed as additional wall material on the diametrically opposite, upper and lower dead centers of the exterior wall surface and extending longitudinally, substantially along the full length of the exterior wall surface of the tube, substantially parallel to the central axis of the tube to form thickened wall sections;
- said tube and the ribs being formed integrally of a one-piece metal extrusion;
- sockets formed on said connection member and on said wheel support for receiving the opposite ends of the axle;
- said sockets having grooves for receiving end portions of the ribs along with the respective end portions of the tube;
- whereby the ribs provide sufficient additional wall thickness to reinforce and stiffen and prevent bending, flexing or twisting relative to the sockets when subjected to loads during use of the axle on a vehicle.

9. A vehicle axle system as defined in claim 8, and including a portion of the ribs being removed from at least one end portion of the axle to form an end stub which fits within an adjacent socket, in addition to the adjacent rib portion fitting within the socket groove.

10. A vehicle axle system as defined in claim 9, and including said axle tube having a substantially uniform exterior surface cross-section and an interior opening defined by an interior wall surface which, at pre-determined locations, has a smaller diameter than other portions of the opening to form inwardly thickened wall cross-sectional portions separated by thinner wall thickness sections, with the thicker sections being based upon increasing the strength for resisting anticipated loads that may be applied to such locations during use of the axle.

* * * * *